Sept. 2, 1952 G. B. GUTHRIE, JR 2,609,501

PULSE WIDTH DISCRIMINATOR CIRCUIT

Filed Jan. 3, 1946

INVENTOR.
GEORGE B. GUTHRIE, JR.
BY
William D. Hall
ATTORNEY

Patented Sept. 2, 1952 2,609,501

UNITED STATES PATENT OFFICE 2,609,501

PULSE WIDTH DISCRIMINATOR CIRCUIT

George B. Guthrie, Jr., Pasadena, Calif., assignor, by mesne assignments, to the United States of America as represented by the Secretary of War Application January 3, 1946, Serial No. 638,892

5 Claims. (Cl. 250—27)

This invention relates generally to electrical circuits and more particularly to pulse length discriminator circuits.

It is often desirable to provide a circuit which will accept a pulse of a certain critical length or greater, but will reject a pulse whose length is less than the critical value. It is also desirable to provide such a circuit which is insensitive to the amplitude of the pulse. One application of such a circuit is in radio beacon systems.

It is an object of this invention, therefore, to provide a circuit which will accept pulses of a critical length or greater and reject pulses whose length is less than the critical value.

It is a further object of this invention to provide a pulse length discriminator which is insensitive to pulse amplitude.

In general this invention comprises two triodes which substantially subtract the incoming pulse from an integrated waveform generated by the pulse. An output pulse is obtained only when the incoming pulse is of sufficient duration to permit the integrated wave to rise to a critical value.

Other objects, features and advantages of this invention will suggest themselves to those skilled in the art and will become apparent from the following description of the invention taken in connection with the accompanying drawing in which.

Figure 1:
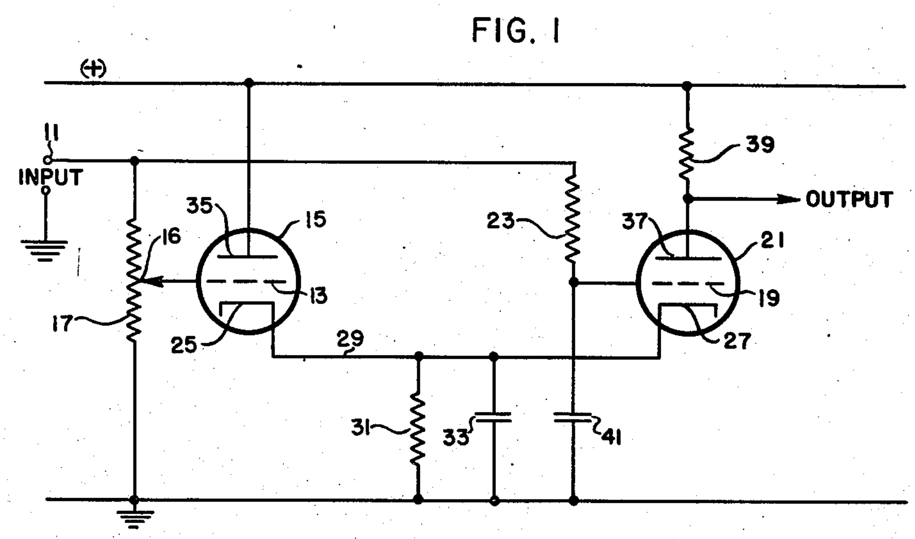
Fig. 1 is a schematic circuit diagram of this invention.

Referring now more particularly to Fig. 1, the input terminal 11 connects to grid 13 of vacuum tube 15 through arm 16 of potentiometer 17 and also to grid 19 of vacuum tube 21 through resistor 23. Potentiometer 17 connects between terminal 11 and ground. Cathode 25 of tube 15 and cathode 27 of tube 21 are electrically connected by lead 29. Resistor 31 and capacitor 33 are connected between lead 29 and ground and are connected in parallel with each other. Plate 35 of tube 15 is connected to a source of positive potential. Plate 37 of tube 21 is connected to a source of positive potential through resistor 39. Capacitor 41 is connected between grid 19 and ground.

Figure 2:
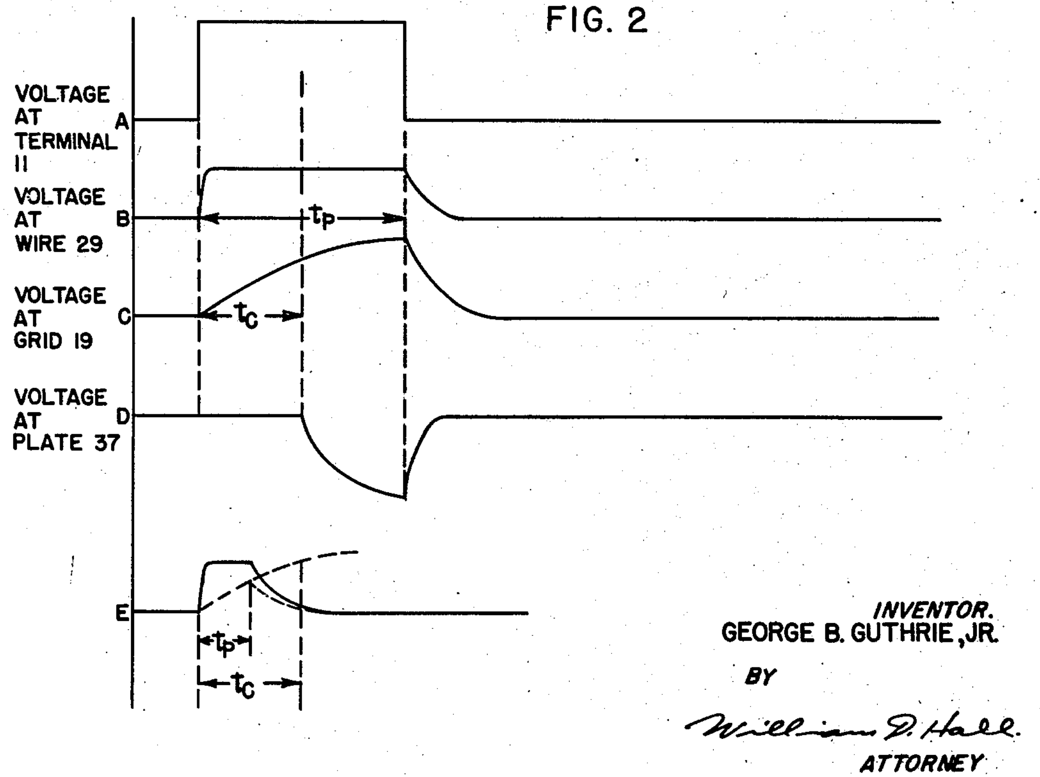
Fig. 2 shows a group of waveforms relating to the operation of the circuit.

Fig. 2A is the voltage waveform at terminal 11. Fig. 2B is the voltage waveform at the lead 29. Fig. 2C is the voltage waveform at grid 19. Fig. 2D is the voltage waveform at plate 37. Fig. 2E will be described later.

In operation, substantially rectangular positive pulses are applied between terminal 11 and ground. Circuit constants are so chosen that tube 15 is normally conducting and tube 21 is biased substantially at cut-off due to the resulting voltage across resistor 31. The amplitude of the input pulse appearing at grid 13 is determined by the setting of potentiometer 17. A positive pulse appears at lead 29 as shown in Fig. 2B due to cathode follower action. The leading edge is exponential due to capacitor 33 charging through the plate resistance of tube 15. The trailing edge is also exponential due to the discharging of capacitor 33 through resistor 31. This voltage appears at the cathodes 25 and 27. The voltage waveform at the grid 19 is an integration of the input pulse due to the charging and discharging of capacitor 41 through resistor 23. Therefore, the grid 19—ground voltage is essentially an integration waveform of the input pulse while the cathode 27—ground voltage is essentially a rectangular pulse with an exponential tail, the amplitude of this pulse being somewhat less than the input pulse and the amplitude being determined by the setting of the potentiometer 17 and the gain of the cathode follower tube 15. It will be obvious then that the cathode 27—ground voltage is effectively subtracted from the grid 19—ground voltage and so long as the amplitude of grid 19—ground integrated waveform is less than the cathode 27—ground rectangular waveform the tube 21 will remain in a nonconducting state. However, when the integrated waveform rises above the amplitude of the rectangular waveform the tube 21 will conduct and a negative signal will appear at the plate 37.

If $t_p$ is equal to the time duration of the input pulse and $t_c$ is equal to the time for the integrated wave to reach an amplitude equal to the rectangular wave, it will be seen that when $t_p$ is equal to or greater than $t_c$, a signal will appear at the plate 37. However, if $t_p$ is less than $t_c$, as shown in Fig. 2E, no signal will appear at the plate 37.

It will be seen that as an input pulse of a given time duration varies in amplitude, the waveforms at the grid 19 and cathode 27 vary in amplitude proportionally and the relationships $t_p$ and $t_c$ do not change. Therefore, pulse length discrimination is substantially independent of pulse amplitude.

For proper operation of the circuit, the time constant of the trailing edge of the cathode 27—ground waveform is, in practice, at least as great as the time constant of the trailing edge of the integrated waveform, i. e., across the grid 19—ground circuit. If this were not so, the amplitude of the trailing edge of the integrated waveform would exceed that of the waveform across the cathode 27—ground circuit and conduction would occur in tube 21. This will happen even if $t_p$ is shorter than $t_c$. It might also be pointed out that the output pulse shape is improved by having the exponential trailing edge on the waveform impressed on the cathode 27—ground circuit since this portion of the waveform essentially cancels out the discharge portion of the integrated waveform.

It will be seen that the circuit herein set forth will accept only pulses of a critical length or greater, the acceptance being independent of pulse amplitude. Therefore, it will be unnecessary to have a signal limiting stage before the discriminator.

While there has been described what is at present considered to be the preferred embodiment of this invention, it will be obvious to those skilled in the art that various changes and modifications may be made therein without departing from the scope of the invention as set forth in the appended claims and I claim all such changes and modifications as fall fairly within the spirit and scope of the invention.

What is claimed is:

1. In a pulse discriminator circuit, a first vacuum tube having at least a cathode, a control grid, and plate, means for applying a pulse signal to the control grid of said first tube from a source external to said circuit, a potentiometer connected between said means and ground, the arm of said potentiometer being connected to the grid of said first tube, a first resistive means connecting the cathode of said first tube to ground, a first capacitive means connecting said cathode of said first tube to ground, means connecting the plate of said first tube to a source of positive potential, a second vacuum tube having at least a cathode, control grid, and plate, means connecting said cathode of said first tube to the cathode of said second tube, a second resistive means connecting the source of the input pulses to the grid of said second tube, a second capacitive means connecting said grid of said second tube to ground, and a third resistive means connecting the plate of said second tube to a source of positive potential.

2. A pulse width discriminator circuit comprising, a cathode follower stage having a control grid, an amplifier stage having a control grid, said stages having a common cathode biasing circuit, means for rendering said cathode follower stage normally conducting and said amplifier stage biased substantially to cut-off, resistive means for simultaneously applying a pulse signal to said control grids, capacitive means connecting said amplifier stage control grid to ground, whereby the application of an input pulse causes a similar pulse to be impressed across the said amplifier cathode circuit and an integration waveform of the input pulse to be impressed on the grid of said amplifier stage, and means for deriving an output pulse from said amplifier stage in response to an integration waveform pulse having an amplitude exceeding the amplitude of the pulse waveform across the said cathode circuit of said amplifier stage.

3. A pulse with discriminator circuit comprising, first and second vacuum tubes each having at least a cathode, control grid, and anode, a cathode load circuit common to both tubes, an integrating circuit connected to the control grid of said second tube, means for simultaneously applying an input pulse signal to the control grids of said first and second tubes, and means for deriving an output signal from said second tube in response to an input pulse signal having more than a predetermined duration.

4. A pulse width discriminator circuit comprising a cathode follower circuit and a normally non-conducting amplifier each having a cathode and control grid, a load circuit for said cathode follower coupled between the grid of said amplifier and both cathodes, means for simultaneously impressing a positive-going pulse signal on said control grids, a first integrating means including said load circuit for integrating the output pulse signal of the cathode follower, a second integrating means coupled to the grid of said amplifier for integrating the pulse signal impressed on the amplifier control grid, said first integrating means having a faster charging rate and a slower discharging rate than said second integrating means, whereby an output signal is produced by said amplifier when a predetermined voltage relation between the outputs of said first and second integrating means is reached.

5. A pulse width discriminator circuit comprising means for producing a first output voltage pulse when an input voltage pulse is applied thereto, a circuit coupled to said pulse producing means for integrating said first output voltage pulse to produce a second output voltage pulse, means for integrating said input voltage pulse to produce a third output voltage pulse, and normally inoperative switch means receptive of both said second and third output voltage pulses and responsive only to a predetermined voltage difference between said second and third output voltage pulses, said integrating circuit having a time constant that is small relative to that of said means for integrating.

GEORGE B. GUTHRIE, JR.

REFERENCES CITED

The following references are of record in the file of this patent:

UNITED STATES PATENTS

| Number | Name | Date |
| --- | --- | --- |
| 2,275,930 | Torcheux | Mar. 10, 1942 |
| 2,287,926 | Zepler | June 30, 1942 |
| 2,405,843 | Moe | Aug. 13, 1946 |
| 2,438,910 | Grieg | Apr. 6, 1948 |

FOREIGN PATENTS

| Number | Country | Date |
| --- | --- | --- |
| 528,192 | Great Britain | Oct. 24, 1940 |